United States Patent [19]

Arthur

[11] Patent Number: 4,464,146
[45] Date of Patent: Aug. 7, 1984

[54] APPARATUS FOR MAINTAINING TENSION OF AN ENDLESS DRIVE MEMBER

[75] Inventor: Gene M. Arthur, Norwalk, Ohio
[73] Assignee: Imperial Clevite Inc., Glenview, Ill.
[21] Appl. No.: 378,597
[22] Filed: May 17, 1982
[51] Int. Cl.³ ............................................. F16H 7/12
[52] U.S. Cl. .................................... 474/133; 474/135
[58] Field of Search ............... 474/133, 134, 135, 117, 474/118; 267/152, 154, 22 A, 57.1 R, 57.1 A; 384/145

[56] References Cited

U.S. PATENT DOCUMENTS

| | | | |
|---|---|---|---|
| 3,133,769 | 5/1964 | Drake | 384/145 |
| 3,524,359 | 8/1970 | Buchwald | 474/94 |
| 3,545,737 | 12/1970 | Lamprey | 267/154 X |
| 3,817,113 | 6/1974 | Pfarrwaller | 474/134 |
| 3,975,965 | 8/1976 | Speer | 474/135 |
| 3,998,503 | 12/1976 | Van Wyk | 267/57.1 A X |
| 4,144,772 | 3/1979 | Brackin et al. | 474/135 |

FOREIGN PATENT DOCUMENTS 2102097  1/1983  United Kingdom.

Primary Examiner—Leslie A. Braun
Assistant Examiner—Frank McKenzie
Attorney, Agent, or Firm—Russell E. Baumann

[57] ABSTRACT

An apparatus is disclosed for maintaining tension on an endless drive member such as a belt or chain. A pulley or sprocket (10) is provided to impart a tensioning force to the drive member, the pulley being supported at one end of a torque arm (16) and the torque arm being pivotably mounted at its other end by a torque applying and oscillation damping assembly (18) comprising a lubricated elastomeric bushing assembly (26-34) and a coaxial, telescoped elastomeric spring assembly (36-48), whereby oscillations of the rubber spring, torque arm and pulley assembly are damped by the elastomeric bushing assembly. See FIGS. 1-3.

15 Claims, 7 Drawing Figures

APPARATUS FOR MAINTAINING TENSION OF AN ENDLESS DRIVE MEMBER

DESCRIPTION

1. Technical Field

The invention is concerned with an apparatus for maintaining the tension of moving endless members such as belts or chains. Such devices are particularly useful for maintaining the tension of drive belts used to operate accessory equipment on automobile engines.

2. Background Art

On modern automobile engines, a number of accessory equipments such as air conditioners, alternators, power steering pumps, water pumps and the like are driven by an endless drive member such as a V-type or flat ribbed belt. During various phases of engine operation, such belts are known to hop or skip while moving so that the accessory equipments may experience undesirable slippage and fluctuation in applied torque. To combat this, it has been known to provide some sort of device for applying a continuous, preferably steady force to the belt in order to maintain its tension within desired limits.

Early attempts to solve this type of problem involved the use of a simple idler pulley biased into contact with the belt by means such as a coil spring. In other applications, idler pulleys have been provided with centrally located, inflated toroidal tubes which are compressed when tension is applied to the belt and thus serve to urge the pulley against the belt to maintain its tension. Tension in an endless drive member also has been maintained by an idler pulley or sprocket mounted at one end of a torque arm which is pivotably supported at its opposite end by a spring element. A pair of tubes and a body of resilient material captured between the tubes have been used as spring elements, the resilient material acting as a torsion spring which permits limited rotation of the torque arm.

While such prior art devices are quite suitable for use in many applications, they have a tendency to bounce out of contact with the drive member in response to various changes in the operating speed and tension of the drive member itself. Typically, the spring element of such prior devices is not effectively damped, so that the device itself may oscillate and introduce further, unwanted variations in belt tension. As a result, the drive member may slip on the drive pulleys or sprockets of the accessory equipment. A need has continued to exist for a belt or chain tensioning device which is properly damped so that it will remain in contact with and apply a tensioning force to the drive member, thus minimizing slippage during anticipated operating conditions.

DISCLOSURE OF THE INVENTION

A primary object of the present invention is to provide an improved apparatus for maintaining sufficient tension in an endless drive member to prevent slippage of the member on associated driven pulleys or sprockets.

A further object of the present invention is to provide such an apparatus which is compact and economical to manufacture.

Yet another object of the invention is to provide such an apparatus in which rotational oscillation of a torque applying elastomeric spring is damped by the drag force of a self-lubricated bearing.

Still another object of the invention is to provide such an apparatus in which operation of the device is strongly resisted until a minimum breakaway force has been applied by the drive member, thus reducing any tendency for the apparatus to bounce or hop in response to small variations in tension of the drive member.

These objects of the invention are given only by way of examples; therefore, other desirable objectives and advantages inherently achieved by the disclosed structure may occur or become apparent to those skilled in the art. Nonetheless, the scope of the invention is to be limited only by the appended claims.

The apparatus according to the invention is particularly suited for maintaining tension in endless drive members such as belts or chains. A torque arm is provided at one end with means such as a sprocket or pulley for engaging an endless drive member to impart a tension maintaining force. The opposite end of the torque arm is supported for rotation about an axis by an elastomeric spring having a central bore and an outer circumferential surface, the elastomeric spring having a first spring rate. One of the surfaces of the elastomeric spring is secured against rotation about its axis. Means are attached to the torque arm and to the other of the surfaces of the elastomeric spring for causing the other surface to twist or rotate about the axis of the spring. As a result, a countertorque is induced in or released from the elastomeric spring in response to changes in force applied to the torque arm by a drive member acting on the pulley or sprocket. Rotation of the elastomeric spring is resisted by a further means which provides an essentially elastic resistance at a second, substantially higher spring rate until a predetermined breakaway torque has been applied and which thereafter allows rotation of the elastomeric spring and simultaneously provides a smaller, essentially uniform drag torque to damp oscillations of the apparatus.

In a preferred embodiment of the invention, the means for resisting rotation comprises a first sleeve, means for securing the sleeve against rotation and a second sleeve attached to the torque arm, the second sleeve being coaxial with the first sleeve. Compressed between the first and second sleeves is an elastomeric bushing which permits rotation of the second sleeve around the first sleeve. The bushing is bonded to the first sleeve and comprises lubricant retaining means such as small pockets in its surface which engages the second sleeve. As a result, lubricated, rotary motion is caused between the elastomeric bushing and the second sleeve when the predetermined breakaway torque has been applied to the second sleeve to break the frictional engagement between the bushing and the second sleeve.

In a preferred embodiment of the invention, the first and second sleeves and the elastomeric bushing are telescoped together and two elastomeric springs are provided, one positioned about each end of the second sleeve. A pair of end caps, each having a radially extending end wall engaging the first sleeve and an axially extending side wall engaging the fixed surface of its associated elastomeric spring, complete the assembly. Preferably, each elastomeric spring is bonded at its central bore to a third sleeve which is press-fitted over the second sleeve. To facilitate this press-fitting, the radially extending end wall of each end cap is provided with a plurality of openings through which an appropriate tool may be inserted to apply an axial force to the third sleeve.

In another embodiment of the invention, the means for resisting rotation of the elastomeric spring comprises a first sleeve attached to the torque arm and engaged with the outer circumferential surface of the elastomeric spring. A second sleeve, coaxial with the first sleeve, is engaged with the central bore of the elastomeric spring and a pair of the elastomeric bushings are positioned at either end of the first sleeve to permit rotation of the first sleeve relative to the second sleeve once the desired breakaway torque has been achieved. Each of the elastomeric bushings is secured within an end cap, the second sleeve and the end caps being secured against rotation.

Preferably, the breakaway torque of the means for resisting rotation of the elastomeric spring is a relatively small fraction of the desired operating torque of the apparatus. For example, a breakaway torque in the range of approximately 10 to 25% of the desired operating torque to be applied by the elastomeric spring will ensure that after the breakaway torque has been reached, sufficient drag or damping force will be applied to the elastomeric spring in order to damp oscillations. If the breakaway torque is too small, inadequate damping will be achieved; whereas, if the breakaway torque is too large, the elastomeric spring may be unable to generate sufficient torque both to overcome the breakaway torque and to apply adequate force to the torque arm to maintain tension in the drive member.

BEST MODE FOR CARRYING OUT THE INVENTION

Figure 1:
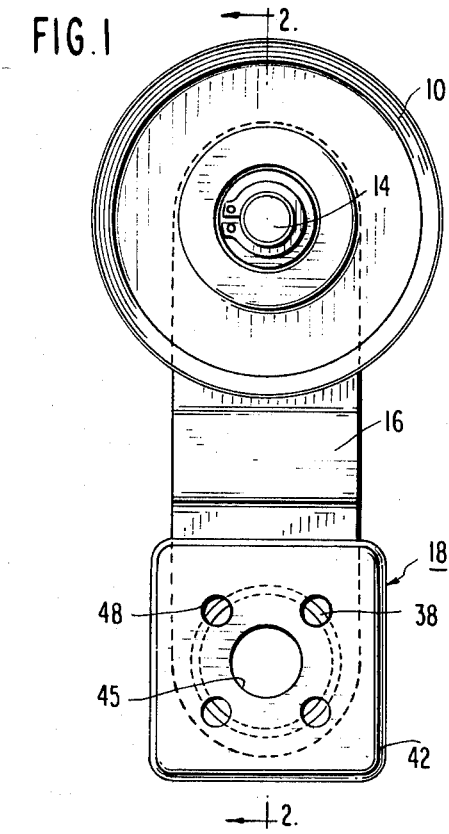
FIG. 1 shows a front elevation view of an apparatus according to the invention.

The following is a detailed description of the preferred embodiments of the invention, reference being made to the drawings in which like reference numerals identify like elements of structure in each of the several figures.

Figure 2:
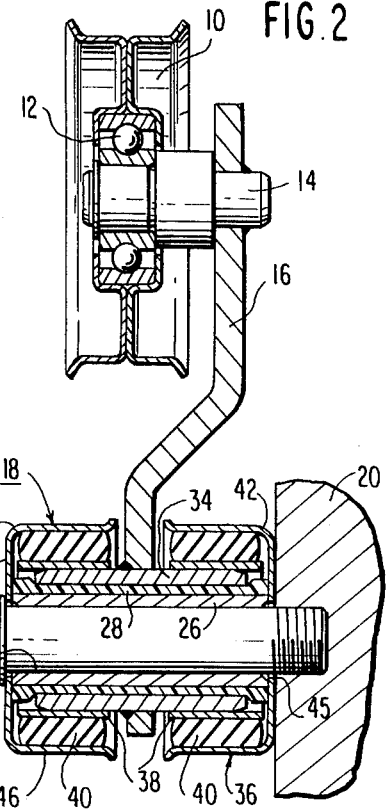
FIG. 2 shows a section view taken along line 2—2 of FIG. 1.
Figure 3:
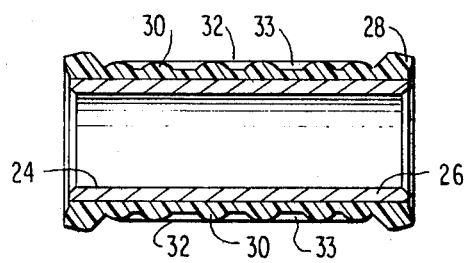
FIG. 3 shows an enlarged, sectional view of the type of elastomeric bushing preferred for the invention.

Referring now to FIGS. 1-3, the apparatus according to the invention is seen to comprise a pulley 10 or similar device such as a chain sprocket which, in use, engages and imparts a force to an endless belt or chain (not illustrated) in order to maintain its tension within desired limits. Pulley 10 is rotatably supported by a bearing 12 on a shaft 14 which is fixed to the outer end of a torque arm 16. A torque applying and oscillation damping assembly 18 pivotably supports arm 16 at its opposite end. Assembly 18 is attached to a fixed support 20, such as an engine block, by means such as a bolt 22 which passes through the central bore 24 of assembly 18, as illustrated in FIG. 2.

Bore 24 is defined by a metal sleeve 26 which is bonded on its outside diameter to a cylindrical, elastomeric bushing 28 which preferably is made from a urethane plastic. Bushing 28 is of the general type disclosed in U.S. Pat. 3,133,769, the disclosure of which is hereby incorporated by reference into this application. As shown in FIG. 3, bushing 28 includes a plurality of circumferentially extending, rounded ridges or lands 30 which intersect with a further plurality of axially extending, rounded ridges or lands 32 to define a plurality of lubricant retaining pockets 33. These pockets are filled with a suitable lubricant, such as a silicone oil, just before the assembly of elements 26-32 is inserted under compression into the central bore of a metal sleeve 34 welded or otherwise attached to torque arm 16, as illustrated in FIG. 2. Torque arm 16 is offset so that the plane of rotation of pulley 10 is essentially the same as the plane of rotation of arm 16 where it joins sleeve 34.

At either end of sleeve 34 is mounted an elastomeric spring assembly 36. A metal sleeve 38 is bonded at its outer diameter to an elastomeric spring such as a rubber body 40 having a circular central bore. The outer circumferential surface of body 40 is more or less square to permit the body to be pressed or "shot" into an end cap 42. The inside diameter of sleeve 38 is sized to permit the sleeve to be tightly press-fitted onto sleeve 34 so that when sleeve 34 is rotated by arm 16, rubber body 40 is subjected to torsion and reacts as a spring. As shown in FIGS. 1 and 2, end caps 42 include radially extending end walls 44 provided with central bores 45 which are sized to match the inside diameter of sleeve 26. Walls 44 engage the opposite ends of sleeve 26 so that bolt 22 secures end caps 42 and sleeve 26 against rotation. Caps 42 also include axially extending side walls 46 which engage the square exterior of body 40 to secure it against rotation when the assembly is mounted as illustrated in FIG. 2. To facilitate press-fitting of the assembly of elements 38-46 onto sleeve 34, a plurality of holes 48 are provided in end wall 44 to provide access to the end of sleeve 38 using a suitable tool.

To size the various elements of the apparatus shown in FIGS. 1-3 for a particular application, it is necessary to know the nominal pressure to be applied to the moving drive member by pulley 10. If a pressure of 150 pounds is desired and space limitations require torque arm 16 to be no longer than 4 inches, then a torque of 600 inch pounds must be provided by elastomeric springs 40. Typically, the useful range of such rubber springs is approximately 20°. As a result, the initial bias or preset nominal wind-up of the apparatus should be approximately 15°. That is, when the apparatus is installed as illustrated in FIG. 2, torque arm 16 will be rotated approximately 15° from the fully relaxed position of rubber springs 40 in order to reach the position at which pulley 10 engages the endless drive member. Since 600 inch pounds of torque must be developed at this position, the spring rate of rubber springs 40 must be at least 40 inch pounds per degree.

Figure 4:
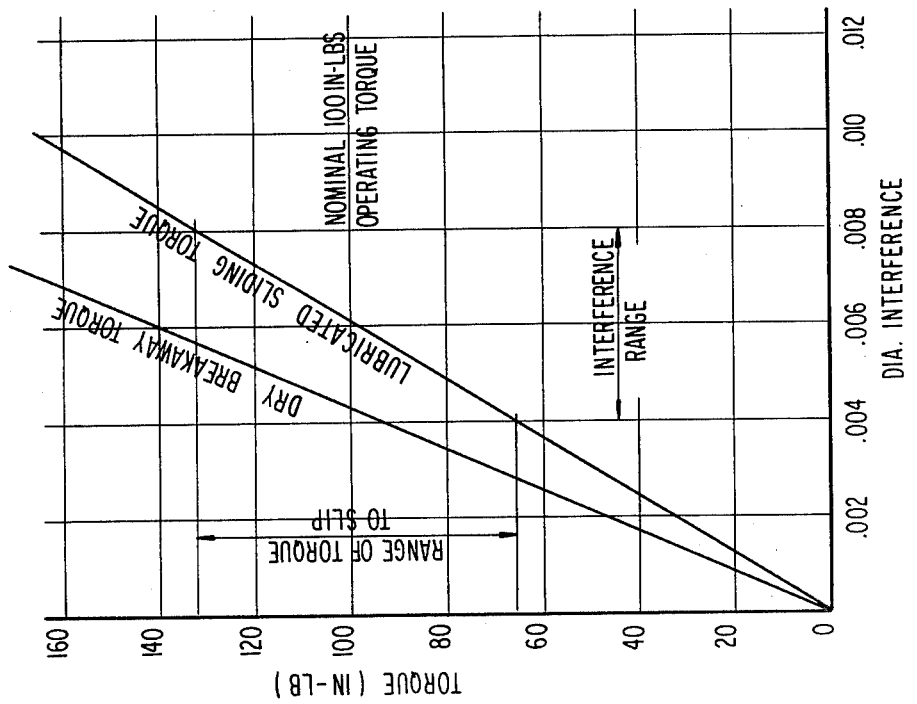
FIG. 4 shows a plot of torque versus diametral interference for the elastomeric bushing.

FIG. 4 illustrates the torque characteristics of elastomeric bushing 28 as a function of its diametral interference fit with sleeve 34. Bushings of this type have the characteristic that when torque is applied, only very slight rotation is achieved until a certain breakaway torque has been applied, after which the lubricant captured in pockets 33 permits continued rotation at a somewhat reduced torque. However, should the applied torque drop to approximately the magnitude of the initial breakaway torque, the elastomeric bushing 28 will cease rotation. In this invention, bushing 28 is intended to provide sufficient rotational drag to damp oscillations of rubber spring 40. In the present example, a nominal drag torque of approximately 100 inch pounds is preferred. However, elastomeric bushings having a breakaway torque in the range of 67.5 to 132.5 inch pounds, or approximately 10 to 25% of the maximum torque to be applied, have also been found to provide adequate damping force. For example, an elastomeric bushing approximately 2.040 inches in length, having an outside diameter of approximately 1.021 inches, an inside diameter of approximately 0.8 inches, 12 equally spaced axial lands 32, and 6 equally spaced circumferential lands 30 each land being approximately 0.038 inch radially in height and having a radius of curvature of approximately 0.130 inch, has been found to provide adequate breakaway torque and damping force. Bushings made from urethane plastic having a durometer reading of 50 on the Shore D scale and a tensile strength of 5000 psi are preferred. See ASTM Specification No. 1BG970A14B14F17. Of course, any material having similar properties may be used.

The previously mentioned spring rate of rubber springs 40 is a function of the diameter of sleeve 38, the radial thickness of the spring, its axial length and the bulk modulus of the rubber. In the present example, where the axial length of each rubber spring 40 was approximately 0.875 inches, the inner diameter of the rubber spring was approximately 1.38 inches and the outer circular diameter of the spring was approximately 1.81 inches, it was found that the rubber should have a bulk modulus of 91 and a durometer reading of 65 on the Shore A scale.

Figure 5:
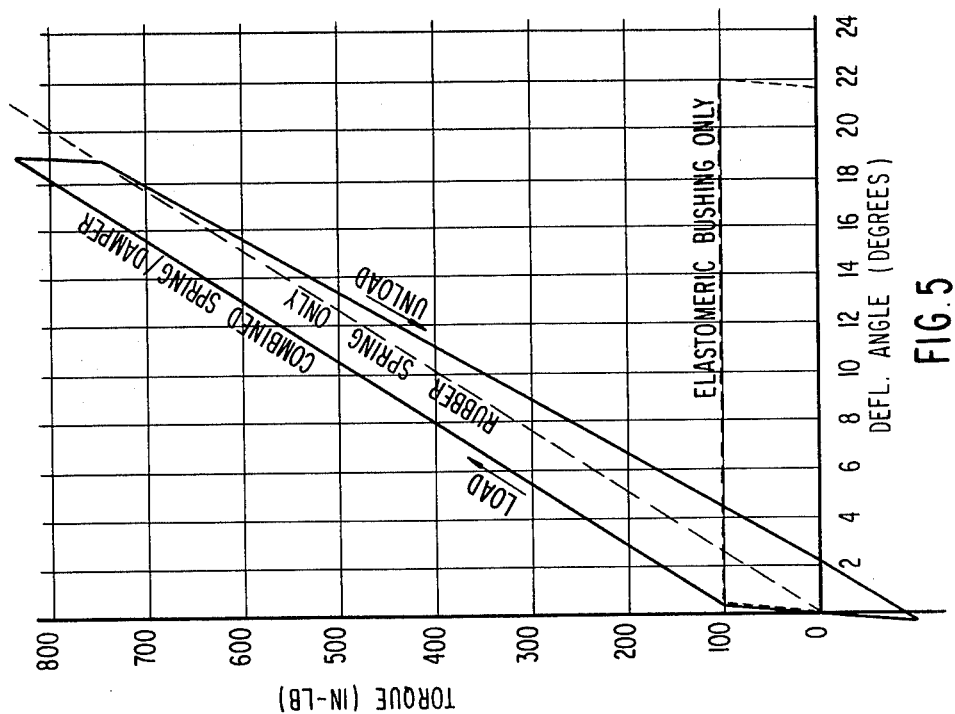
FIG. 5 shows a plot of torque versus deflection angle for the elastomeric bushing alone, the elastomeric spring and the combination of the two according to the invention.

FIG. 5 shows a plot of torque as a function of deflection angle. An elastomeric bushing 28 of the type previously described, if operated alone, will rotate about half a degree, due to very slight elastic deformation of the bushing, until a breakaway torque of approximately 100 inch pounds is applied. This corresponds to a very much higher spring rate of approximately 200 inch pounds per degree. Thereafter, the bushing will continue to rotate at a relatively constant applied torque. In contrast to this, a rubber spring 40, operated alone, requires progressively increasing torque to increase its deflection angle. The combination of the two, as illustrated, will rotate only slightly until the desired breakaway torque has been applied, after which deflection will continue as the torque applied to arm 16 rises. When the torque on arm 16 is released, the rubber spring 40 expends an initial 100 inch pounds of countertorque to overcome the breakaway torque of elastomeric bushing 28, after which torque arm 16 will move in the opposite direction so that force continues to be applied to the belt or chain. When the remaining countertorque stored in rubber spring 40 reaches the level of the breakaway torque of the elastomeric bushing, rotation will cease until sufficient force is applied to the torque arm.

Figure 6:
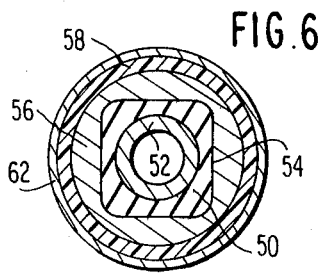
FIG. 6 shows a sectional view of a further embodiment of the invention, taken along line 6—6 of FIG. 7.
Figure 7:
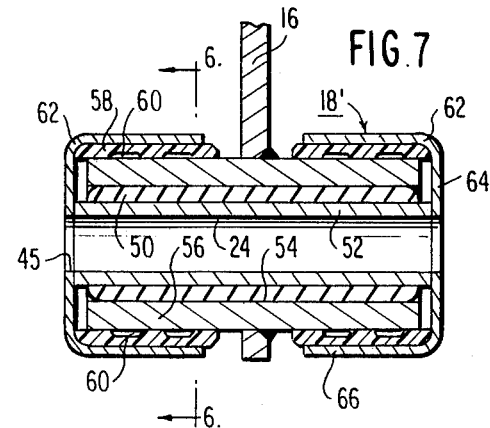
FIG. 7 shows a fragmentary sectional view of a further embodiment of the invention.

FIGS. 6 and 7 illustrate an alternative embodiment of the invention in which elastomeric bushings are positioned outside an elastomeric spring. As illustrated, elastomeric spring body 50 has a circular central bore which is bonded to the outside diameter of a metal sleeve 52. The circumference of spring 50 is more or less square in configuration to permit the spring to be pressed or "shot" into a square bore 54 provided in a further metal sleeve 56 which is attached to torque arm 16. The opposite ends of sleeve 56 support on their outside diameters a pair of elastomeric bushing assemblies 58 in which the lubricant pockets 60 are located on the inside diameter. The outside diameter of each bushing 58 is bonded to the inner surface of an end cap 62 having a radially extending end wall 64 and an axially extending side wall 66. This type of device can be made to function in the same manner as that of FIGS. 1-3; however, the shorter effective radius for the rubber spring requires that the elastomeric bushing have a reduced diametral interference to provide a lower breakaway torque; and that the rubber spring have a higher durometer rating of about 75 and a bulk modulus of about 170.

Having described my invention in sufficient detail to enable those skilled in the art to make and use it, I claim:

1. An improved apparatus for tensioning endless drive members such as belts or chains, said apparatus comprising:
    a torque arm;
    means mounted on said arm for engaging an endless drive member to impart a tension maintaining force thereto;
    means pivotably supporting said torque arm at a location spaced from said means for engaging, for permitting rotation of said torque arm about an axis, said supporting means comprising:
    at least one elastomeric spring having a central bore surface, an outer circumferential surface and a first spring rate;
    means for securing one of said surfaces against rotation about said axis;
    means attached to said torque arm and the other of said surfaces for causing the other of said surfaces to rotate about said axis, whereby a countertorque is induced in or released from said elastomeric spring in response to changes in force applied to said torque arm by a drive member acting on said means for engaging; and
    means, operatively associated with said means for causing said other of said surfaces to rotate, for resisting rotation by providing an essentially elastic resistance at a second, substantially higher spring rate until a predetermined breakaway torque is applied and thereafter for allowing rotation while providing a rotational drag force to damp oscillations of said apparatus.

2. An apparatus according to claim 1, wherein said one of said surfaces is said central bore surface.

3. An apparatus according to claim 1, wherein said one of said surfaces is said outer circumferential surface.

4. An apparatus according to claim 1, wherein said means for resisting rotation comprises:
    a first sleeve;
    means for securing said first sleeve against rotation;
    a second sleeve attached to said torque arm, said second sleeve being coaxial with said first sleeve; and
    elastomeric bushing means compressed between said first and second sleeve for permitting rotation of said second sleeve around said first sleeve, said bushing means comprising lubricant retaining means in its surface which engage said second sleeve and lubricant retained therein; whereby lubricated rotary motion is caused between said bushing means and said second sleeve when said predetermined torque is applied to said second sleeve to break the engagement between said bushing means and said second sleeve.

5. Apparatus according to claim 4, wherein said bushing means is made from urethane plastic having a Shore D durometer of 50 and a tensile strength of 5000 pounds per square inch.

6. Apparatus according to claim 4, wherein said elastomeric spring and said first and second sleeves are telescoped together.

7. Apparatus according to claim 4, wherein said elastomeric spring is made from a rubber having a Shore A durometer of 65 and a bulk modulus of 91.

8. Apparatus according to claim 4, wherein said first sleeve, said second sleeve and said bushing means are telescoped together, and there are two of said elastomeric springs, one positioned about each end of said second sleeve, and said means for securing one of said surfaces comprises a pair of end caps having radially extending walls engaging said first sleeve and axially extending walls engaging said one surface of each of said elastomeric springs.

9. Apparatus according to claim 8, wherein each of said elastomeric springs is bonded at its central bore to a third sleeve which is press-fitted over said second sleeve, further comprising at least one opening in said radially extending wall of each of said end caps, said at least one opening being located to permit access to said third sleeve for adjusting the position of said elastomeric springs relative to said second sleeve.

10. Apparatus according to claim 8, wherein said torque arm is attached to said second sleeve between said two elastomeric springs.

11. Apparatus according to claim 1, wherein said means for resisting rotation comprises:

a first sleeve attached to said torque arm and engaged with said outer circumferential surface of said elastomeric spring;

a second sleeve coaxial with said first sleeve and engaged with said central bore surface of said elastomeric spring;

a pair of elastomeric bushing means, one positioned around each end of said first sleeve, for permitting rotation of said first sleeve relative to said second sleeve, each of said bushing means being secured within an end cap having a radially extending end wall engaging said second sleeve and an axially extending wall engaging said bushing means; and means for securing said second sleeve and said end caps against rotation.

12. Apparatus according to claim 11, wherein said bushing means is made from urethane plastic having a Shore D durometer of 50 and a tensile strength of 5000 pounds per square inch.

13. Apparatus according to claim 11, wherein said elastomeric spring is made from a rubber having a Shore A durometer of 75 and a bulk modulus of 170.

14. Apparatus according to claim 11, wherein said torque arm is attached to said first sleeve between said elastomeric bushings.

15. Apparatus according to claim 11, wherein each of said bushing means is compressed between said first sleeve and its end cap and comprises lubricant containing means in its surface which engages said first sleeve and lubricant retained therein, whereby lubricant rotary motion is caused between said bushing means and said first sleeve when said predetermined torque is applied to said first sleeve to break the engagement between said bushing means and said second sleeve.

* * * * *